(12) United States Patent
Liu et al.

(10) Patent No.: US 11,489,398 B2
(45) Date of Patent: Nov. 1, 2022

(54) WATER CHANNEL STRUCTURE FOR CONNECTING A CONTROLLER TO A MOTOR

(71) Applicant: HEFEI JEE POWER SYSTEMS Co., Ltd., Anhui (CN)

(72) Inventors: Lei Liu, Anhui (CN); Jianhua Mao, Anhui (CN); Zhan Wang, Anhui (CN); Hongxin Wu, Anhui (CN); Yang Yang, Anhui (CN)

(73) Assignee: HEFEI JEE POWER SYSTEMS CO., LTD., Anhui (CN)

( * ) Notice: Subject to any disclaimer, the term of this patent is extended or adjusted under 35 U.S.C. 154(b) by 141 days.

(21) Appl. No.: 16/959,166

(22) PCT Filed: Apr. 26, 2019

(86) PCT No.: PCT/CN2019/084680
§ 371 (c)(1),
(2) Date: Jun. 30, 2020

(87) PCT Pub. No.: WO2019/206307
PCT Pub. Date: Oct. 31, 2019

(65) Prior Publication Data
US 2020/0328650 A1    Oct. 15, 2020

(30) Foreign Application Priority Data
Apr. 28, 2018  (CN) .......................... 201810402395.6

(51) Int. Cl.
*H02K 5/20* (2006.01)
*H02K 11/33* (2016.01)
*H02K 9/19* (2006.01)

(52) U.S. Cl.
CPC .................. *H02K 5/20* (2013.01); *H02K 9/19* (2013.01); *H02K 11/33* (2016.01)

(58) Field of Classification Search
CPC .......... H02K 11/33; H02K 9/19; H02K 5/203; H02K 5/20; H02K 11/30; H02K 9/193;
(Continued)

(56) References Cited

U.S. PATENT DOCUMENTS

| 9,986,665 B2 * | 5/2018 | Kosaka .................. H02M 7/537 |
| 2016/0105084 A1 * | 4/2016 | Ishimaru .............. H02K 11/215 |
| | | 310/54 |

(Continued)

FOREIGN PATENT DOCUMENTS

| CN | 206481185 U | 9/2017 |
| CN | 107554262 A | 1/2018 |

(Continued)

*Primary Examiner* — Alexander A Singh
(74) *Attorney, Agent, or Firm* — Craft Chu PLLC; Andrew W. Chu

(57) ABSTRACT

The water channel structure for connecting a controller to a motor includes a controller main housing and a motor body that are connected and fastened to each other. A water-cooling plate is fastened in the controller main housing. A water inlet and a water outlet are respectively provided at two ends of the controller main housing. A heat dissipation water channel communicating the water inlet with the water outlet inside the controller main housing is formed in the water-cooling plate. A motor water channel is provided inside the motor body. A transition water joint is provided at the water outlet of the controller main housing. The transition water joint is directly connected to a water inlet of the motor water channel.

8 Claims, 3 Drawing Sheets

(58) Field of Classification Search
CPC . H02K 1/20; H02K 11/38; H02K 9/00; H02K 9/02; H02K 9/04; H02K 9/06; H02K 9/08; H02K 9/10; H02K 9/12; H02K 9/14; H02K 9/16; H02K 9/18; H02K 9/225; H02K 9/227
USPC .......... 310/52, 53, 54, 55, 57, 58, 59, 60 R, 310/60 A, 64
See application file for complete search history.

(56) References Cited

U.S. PATENT DOCUMENTS

| | | | |
|---|---|---|---|
| 2016/0233737 A1* | 8/2016 | Nakamura | H02K 5/225 |
| 2016/0248302 A1* | 8/2016 | Nagao | H02K 5/225 |
| 2016/0307822 A1* | 10/2016 | Usui | H01L 23/49562 |

FOREIGN PATENT DOCUMENTS

| | | |
|---|---|---|
| CN | 207207727 U | 4/2018 |
| CN | 108667216 A | 10/2018 |
| JP | 2014187728 A | 10/2014 |

* cited by examiner

WATER CHANNEL STRUCTURE FOR CONNECTING A CONTROLLER TO A MOTOR

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present disclosure relates to a heat dissipation technology of a motor and a controller thereof, and in particular to a water channel structure for connecting a controller to a motor.

2. Description of Related Art Including Information Disclosed Under 37 CFR 1.97 and 37 CFR 1.98

The integrated design of a controller, a motor and a reduction device becomes a trend of designing an electrically-driven system nowadays. An integrated structure can greatly improve the space utilization of the system, and the entire system has a small volume and a light weight. A flat design solution is used for a controller, so that remaining space between the motor and the reduction device is fully utilized. However, the connection between the controller and a motor water channel encounters great challenge. It becomes a technical key to ensure the convenient assembly and reliable sealing between the controller and the motor water channel.

The prior art has the following disadvantages.

1. A controller and a motor water channel are mostly connected by a water pipe in an existing solution, resulting in a relatively long water way and relatively high pressure loss.

2. In the existing manner of connecting the controller to the water pipe of the motor, water joints and related fitting parts need to be added at both ends, resulting in relatively high costs.

BRIEF SUMMARY OF THE INVENTION

The objective of the present disclosure is as follows. Based on an integrated system of a controller, a motor and a reduction device, the present disclosure provides a water channel structure for connecting a controller to a motor, to reduce the length of a water way, reduce a pressure loss of a cooling system, improve the efficiency of the cooling system, and at the same time ensure the convenient assembly and reliable sealing between the controller and a motor water channel.

The technical solution of the present disclosure is as follows.

A water channel structure for connecting a controller to a motor includes a controller main housing and a motor body that are connected and fastened to each other, wherein a water-cooling plate is fastened in the controller main housing, a water inlet and a water outlet are respectively provided at two ends of the controller main housing, the water-cooling plate forms a heat dissipation water channel communicating the water inlet with the water outlet inside the controller main housing, a motor water channel is provided inside the motor body, a transition water joint is provided at the water outlet of the controller main housing, and the transition water joint is directly connected to a water inlet of the motor water channel.

Preferably, radial seal rings are respectively used at junctions between both ends of the transition water joint and the water outlet of the controller main housing and the water inlet of the motor water channel.

Preferably, a film capacitor and an insulated-gate bipolar transistor (IGBT) are further provided in the controller main housing, the IGBT is located above the water-cooling plate, and the film capacitor is located at the bottom of the water-cooling plate.

Preferably, a water inlet joint is provided at the water inlet of the controller main housing, and the water inlet joint is connected to an entire vehicle.

Preferably, a motor rear-end cover of the motor body is fastened to the controller main housing by at least two positioning pins.

The advantages of the present disclosure are as follows.

1. In this solution, the controller and the motor water channel are only directly connected by one water joint, so that the structure is compact, the assembly is simple, fewer parts are used, and costs are greatly reduced.

2. In this solution, the controller and the motor water channel are directly connected, so that the length of a water way is shortened, a pressure loss of a cooling system is reduced, and the efficiency of the cooling system is improved.

3. In this solution, the two positioning pins are provided on the motor housing to limit the connection and assembly of the controller and the motor water channel, so that the structure is simple and the mounting is convenient.

4. A radial sealing solution is used at both ends of the transition water joint between the controller main housing and the motor body in this solution, thereby achieving adequate adaptability to vibration and greatly improving the reliability of sealing.

BRIEF DESCRIPTION OF THE SEVERAL VIEWS OF THE DRAWINGS

The present disclosure is further described below with reference to the accompanying drawings and embodiments.

DETAILED DESCRIPTION OF THE INVENTION

Figure 1:
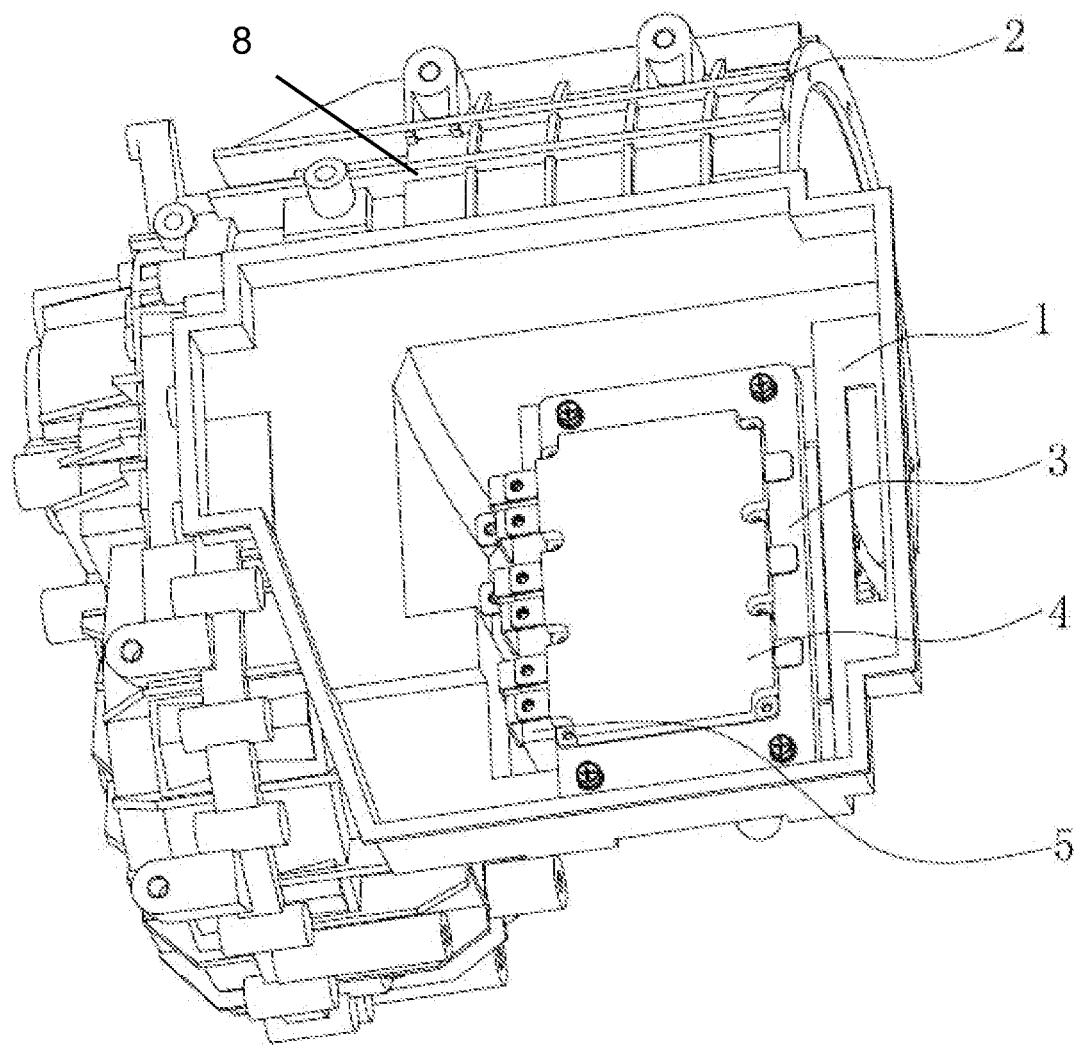
FIG. 1 is a schematic diagram of the entire external structure of a water channel structure for connecting a controller to a motor according to the present disclosure.
Figure 2A:
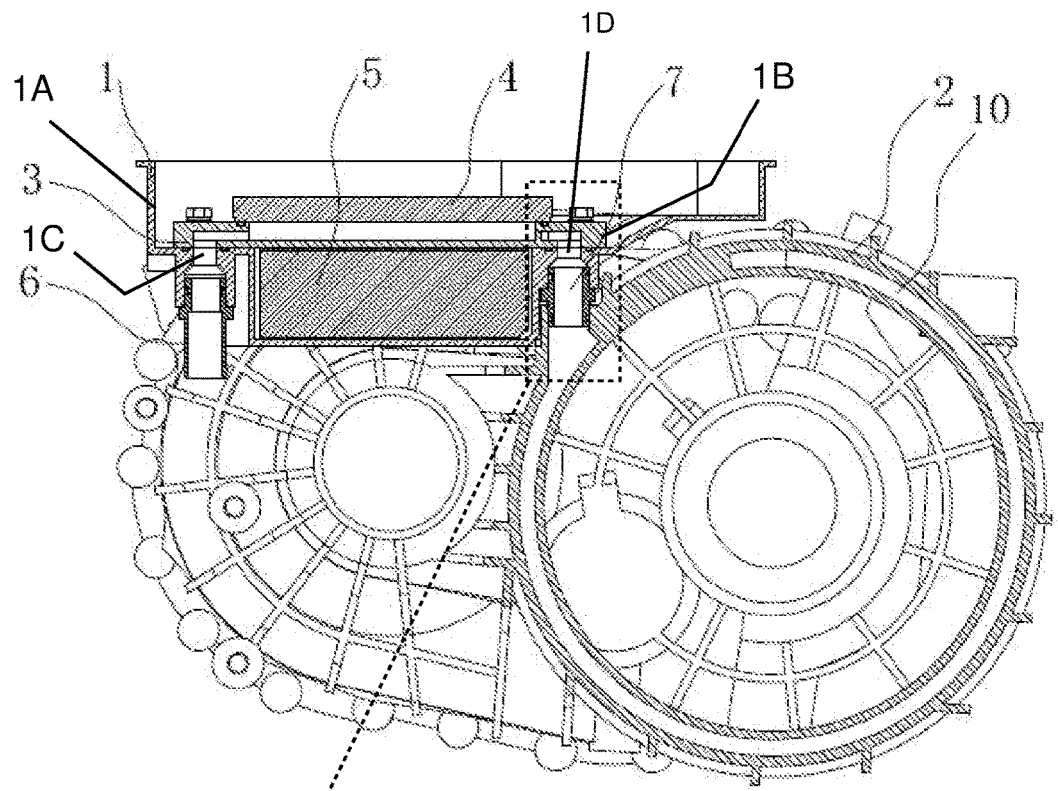
FIG. 2A is a schematic view of the front structure of a water channel structure for connecting a controller to a motor according to the present disclosure.
Figure 2B:
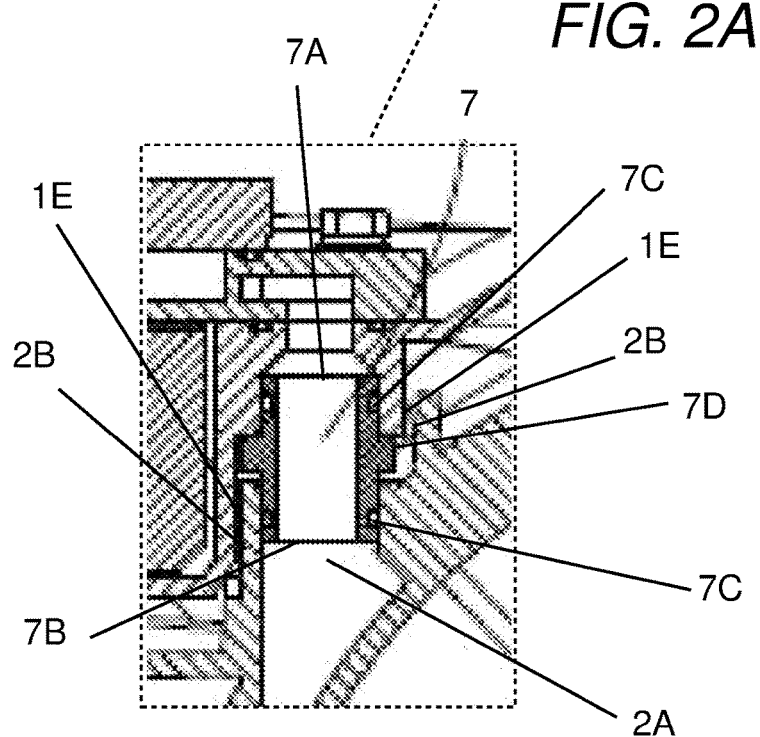
FIG. 2B is an enlarged view of a portion indicated on FIG. 2A.

As shown in FIGS. 1, 2A and 2B, a water channel structure for connecting a controller to a motor disclosed in the present disclosure includes a controller main housing 1 (having one end 1A with a main housing inlet 1B, another end 1C with a main housing outlet 1D, and a main housing engagement surface 1E around the main housing inlet) and a motor body 2 (having a motor body inlet 2A and a motor body engagement surface 2B around the motor body inlet) that are connected and fastened to each other. A water-cooling plate 3 is fastened in the controller main housing 1. An IGBT (Insulated Gate Bipolar Transistor) 4 of the controller is located above the water-cooling plate 3. A film capacitor 5 is located at the bottom of the water-cooling plate 3. A water inlet and a water outlet are respectively provided at two ends of the controller main housing 1. The water-cooling plate 3 forms a heat dissipation water channel communicating the water inlet with the water outlet inside the controller main housing.

A motor water channel 10 is provided in the motor body 2. A water inlet joint 6 is provided at the water inlet 1B of the controller main housing 1. The water inlet joint 6 is connected to an entire vehicle. A transition water joint 7 (having a main housing end 7A and a motor body end 7B opposite the main housing end) is provided at the water outlet of the controller main housing 1. The transition water joint 7 is directly connected to a water inlet (motor body inlet 2A) of the motor water channel 10. As shown in FIGS. 2A and 2B, the main housing inlet is aligned with the motor body inlet by the main housing engagement surface engaging said motor body engagement surface so as to directly connect to the main housing end of the transition water joint to the main housing outlet and the motor body end of the transition water joint to the motor body inlet. Radial seal rings 7C are respectively used at junctions between both ends of the transition water joint 7 and the water outlet of the controller main housing 1 and the water inlet of the motor water channel 10.

Figure 3:
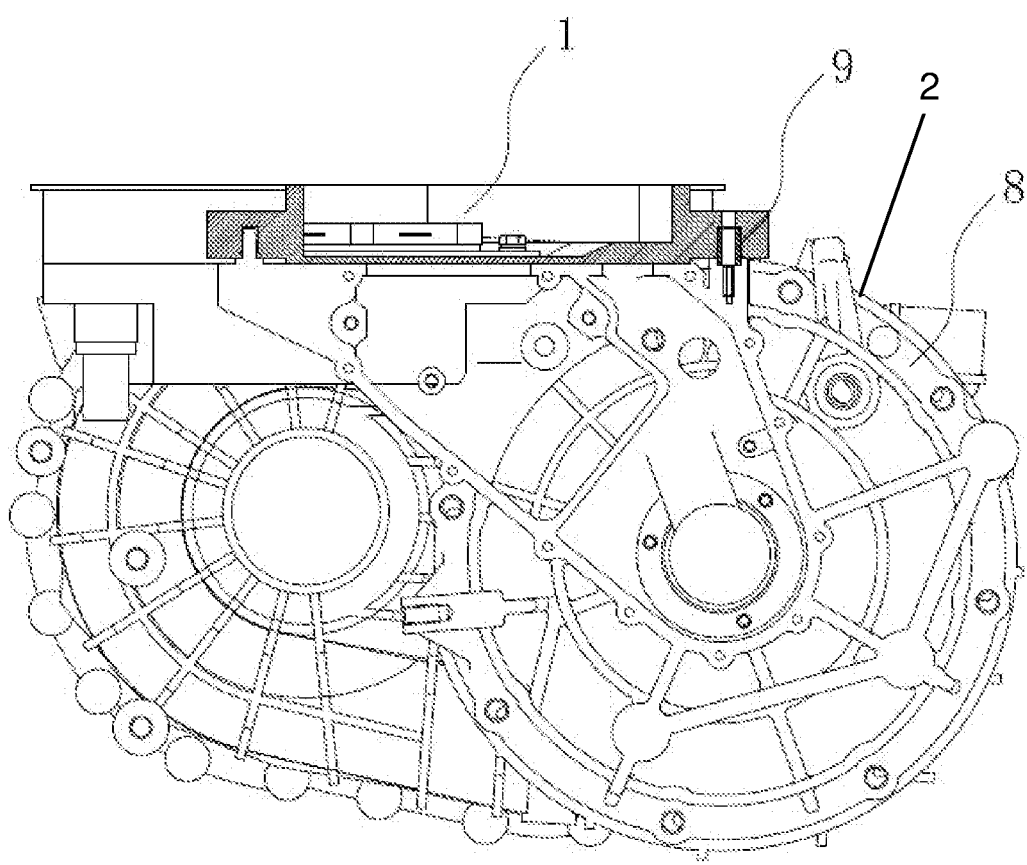
FIG. 3 is a schematic diagram of the rear structure of a water channel structure for connecting a controller to a motor according to the present disclosure, Where: 1. controller main housing; 2. motor body; 3. water-cooling plate; 4. IGBT; 5. film capacitor; 6. water inlet joint; 7. transition water joint; 8. motor rear-end cover; 9. positioning pin; and 10. motor water channel.

As shown in FIG. 3, a motor rear-end cover 8 of the motor body 2 is fastened to the controller main housing by two positioning pins 9.

In the present disclosure, the water outlet of the controller main housing 1 is directly connected to the water inlet of the motor water channel 10 by one transition water joint 7, thereby greatly reducing the length of the entire water channel. As shown in FIG. 2B, the transition water joint 7 is comprised of a raised portion 7D between the main housing end and the motor body end to align the motor body inlet and the raised portion between the controller main housing and the motor body for the direct connection to reduce length of the flow path. In addition, in consideration of the impact of the vibration of the motor on the controller in an integrated solution, a radial sealing solution is used at junctions between both ends of the transition water joint 7 and the water outlet of the controller main housing 1 and the water inlet of the motor water channel 10, thereby greatly improving the reliability of sealing. In addition, in consideration of the convenience of assembling the transition water joint 7, the two fitting positioning pins 9 are respectively provided on the motor rear-end cover 8 and the controller main housing 1. The entire design solution fully implements the efficiency of heat dissipation and cost optimization while ensuring the reliability of sealing and the convenience of assembly.

The foregoing embodiments are only used to describe the technical concept and characteristics of the present disclosure, and are intended to enable a person skilled in the art to understand the content of the present disclosure and achieve implementation, but shall not be used to limit the protection scope of the present disclosure. Any modification made according to the spirit and essence of the main technical solutions of the present disclosure shall fall within the protection scope of the present disclosure.

We claim:

1. A water channel system for connecting a controller to a motor, comprising:
    a controller main housing having one end with a main housing inlet, another end with a main housing outlet, and a main housing engagement surface around said main housing inlet;
    a water-cooling plate being fastened in the controller main housing so as to form a heat dissipation water channel from said main housing inlet to said main housing outlet inside said controller main housing;
    a motor body having a motor body inlet and a motor body engagement surface around said motor body inlet,
    wherein said motor body is comprised of a motor water channel inside said motor body and in fluid connection with said motor body inlet; and
    a transition water joint having a main housing end and a motor body end opposite said main housing end,
    wherein said main housing outlet is aligned with said motor body inlet by said main housing engagement surface engaging said motor body engagement surface so as to directly connect to said main housing end of said transition water joint to said main housing outlet and said motor body end of said transition water joint to said motor body inlet.

2. The water channel system, according to claim 1, further comprising:
    radial seal rings, wherein a first radial seal ring of said radial seal rings is mounted on said main housing end between said transition water joint and said main body outlet, and wherein a second radial seal ring of said radial seal rings is mounted on said motor body end between said transition water joint and said motor body inlet.

3. The water channel system, according to claim 1, further comprising:
    a film capacitor mounted within said controller main housing below said water-cooling plate; and
    an insulated gate bipolar transistor mounted within said controller main housing above said water-cooling plate.

4. The water channel system, according to claim 1, further comprising:
    a water inlet joint removably connected to said main housing inlet so as to connect to a water tank of an entire vehicle by a cooling water pipe.

5. The water channel system, according to claim 1, said motor body being comprised of a motor rear-end cover being fastened to said controller main housing by at least two positioning pins.

6. The water channel system, according to claim 1, wherein said transition water joint is comprised of a raised portion between said main housing end and said motor body end,
- wherein said main housing outlet is aligned with said motor body inlet by said main housing engagement surface engaging said motor body engagement surface and said raised portion between said controller main housing and said motor body so as to directly connect to said main housing end of said transition water joint to said main housing outlet and said motor body end of said transition water joint to said motor body inlet.

7. A water channel system for connecting a controller to a motor, comprising:
- a controller main housing having one end with a main housing inlet, and another end with a main housing outlet;
- a water-cooling plate being fastened in the controller main housing so as to form a heat dissipation water channel from said main housing inlet to said main housing outlet inside said controller main housing;
- a motor body having a motor body inlet, wherein said motor body is comprised of a motor water channel inside said motor body and in fluid connection with said motor body inlet; and

- a transition water joint being comprised of a main housing end, a motor body end opposite said main housing end, and a raised portion between said main housing end and said motor body end, wherein said main housing outlet is aligned with said motor body inlet by said raised portion between said controller main housing and said motor body so as to directly connect to said main housing end of said transition water joint to said main housing outlet and said motor body end of said transition water joint to said motor body inlet.

8. The water channel system, according to claim 7,
- wherein said main controller housing is further comprised of a main housing engagement surface around said main housing inlet,
- wherein said motor body is further comprised of a motor body engagement surface around said motor body inlet, and
- wherein said main housing outlet is aligned with said motor body inlet by said main housing engagement surface engaging said motor body engagement surface and said raised portion between said controller main housing and said motor body so as to directly connect to said main housing end of said transition water joint to said main housing outlet and said motor body end of said transition water joint to said motor body inlet.

* * * * *